United States Patent Office 3,524,743
Patented Aug. 18, 1970

3,524,743
METHOD OF PROCESSING FLY DUSTS CONTAINING SULPHUR, AND SMELTER MIXED OXIDES OR OTHER MIXED OXIDES CONTAINING ZINC AND LEAD
Hans-Joachim Hellwig, Goslar, and Bernhard Rose, Frankfurt am Main, Germany, assignors to Unterharzer Berg- und Huttenwerke G.m.b.H., Goslar, Germany, a corporation of Germany
No Drawing. Filed Jan. 31, 1968, Ser. No. 701,863
Claims priority, application Germany, Feb. 2, 1967, U 13,519
Int. Cl. C22b 7/02, 13/00, 19/30
U.S. Cl. 75—77                                    10 Claims

ABSTRACT OF THE DISCLOSURE

This invention is concerned with a method of processing industrial fly dusts containing sulphur, and smelter mixed oxides or other mixed oxides containing zinc and lead, to give a crude lead, a slag rich in zinc and sulphur and a secondary fly dust which can be sintered. The essence of the process is mixing the fly dusts and mixed oxides with barium sulphate and an excess of a reducing agent such as coke, and then melting this mixture at a temperature between 820° and 1000° C. About 85% of the total lead content of the mixture separates out in the form of a crude lead melt which is at least 95% pure, while the zinc content of the mixture separates out into the slag and into the secondary fly dust. The sulphur is mainly retained in the slag. The slag is suitable for use as the charge in a zinc smelter and the secondary fly dust is suitable for sintering after it has been separated from the effluent gases from the furnace in which the mixture was melted.

---

The invention relates to a method of processing industrial dusts containing sulphur, and smelter mixed oxides or other mixed oxides containing zinc and lead, such as often result from metallurgical processes as intermediate products or byproducts. These industrial dusts and mixed oxides often contain as impurities ore dust, fly ash, carbon and volatile compounds of other elements. Also, in addition to zinc and lead, they usually contain some tin, an element which is less desired, and often some cadmium, thallium and indium. These mixtures must therefore be processed before they can be further utilised.

There are already a number of known pyrometallurgical and wet processes for treating such dusts, but these methods are either costly or are not capable of providing the desired enrichments and separations of constituents. Moreover they are often unsuitable for handling the very finely divided and highly impure industrial dusts which it is desired to process. It is known for example to heat mixed oxides in a rotary tube furnace under weak reducing conditions at temperatures between 1200 and 1400° C. The volatile constituents, particularly the lead, are driven out and there remains a sintered oxide containing zinc. However, this calcining process is suitable only for treating mixed oxides containing a low concentration of lead, and it produces an effluent dust containing lead and zinc which cannot be recycled due to its particular physical and chemical properties.

Among the zinc and lead mixed oxides which are not suitable for treating by the calcining process, there are those which have a comparatively high fraction of slag. These mixtures are usually very finely divided and before processing usually have to be agglomerated by a sintering machine, for example in a lead blast furnace. However, only dust containing comparatively little zinc can be successfully sintered in a lead blast furnace, because more than 20% of zinc cannot be economically retained in the slag. Furthermore there should not be more than 50% of lead, because more lead than this tends to fuse the charge together, making it impermeable to the passage of the gases.

Very finely divided metallurgical dusts containing a high percentage of zinc can however be processed by adding a solid fuel and roasting in a reducing atmosphere in a rotary furnace. The zinc, lead, cadmium and tin are driven off. The effluent gases from the furnace contain a zinc oxide containing lead, and this impure zinc oxide must then be sintered, either directly or after branching off most of the zinc, to give lead metal. It is also known to melt a lead fly ash containing a little zinc in a rotary flame furnace with an addition of iron and soda, to give a crude lead, the zinc being concentrated in a sulphide slag containing a high fraction of iron. However this method has the disadvantage that the slag also contains a high percentage of lead, iron and tin, and that the secondary fly ash also contains a high fraction of lead. This makes any further processing of these products very difficult.

Mixed oxides containing high fractions of tin can also be processed in rotary tube furnaces, with an addition of soda and reducing carbon. The resulting slag contains high contents of zinc and tin, and lead metal is produced. The disadvantage of this process, apart from the high concentration of tin in the slag, is that the usual kind of furnace lining is strongly attacked by the alkaline melt.

According to the present invention a method of processing fly dust containing sulphur, and smelter mixed oxides or other mixed oxides containing zinc and lead, to give a crude lead, a slag rich in zinc and sulphur and a secondary fly dust which can be sintered, comprises mixing the fly dusts and the oxides with barium sulphate and an excess of a reducing agent and melting this mixture in a furnace at a temperature between 820° and 1000° C.

Zinc is driven off during the melting process, and preferably this zinc is oxidised, with the resulting zinc oxide being precipitated out of the effluent gases leaving the furnace. Lead is contained in a crude lead melt which is formed in the furnace. The sulphur present in the charge is retained in the slag, which may be described as a zinc-barium matte. Due to the amphoteric nature of the barium and, under certain circumstances, of the zinc, this slag is capable of absorbing zinc, among other things, particularly in its compounds with sulphur and oxygen. Furthermore this slag has unexpectedly favourable surface energy properties which give it the ability to separate out the metals which have formed, so that they run down into a sump.

Instead of using pure baryta there may be used a lead and zinc ore with a high content of barium sulphate, for example galena. The concentration of barium sulphate, or of baryta or galena in the mixture can be arranged so that 50% of the zinc escapes. This is then precipitated from the furnace effluent gases in the form of zinc oxide. A good ratio by weight of zinc to barium sulphate in the charge has been found to be between 1:0.5 and 1:1.7, corresponding to a mol ratio of barium sulphate to zinc between 1:7 and 1:2.5. Preferably, however, the ratio of zinc to barium sulphate in the charge is between 1:0.5 and 1:1.4. Any tin remains mainly in the crude lead melt, whereas any cadmium, thallium and indium are mainly driven off in the secondary fly dust, which contains a high concentration of zinc and is easy to sinter.

The process according to the invention is preferably performed in a rotary tube furnace supplied with a countercurrent flow of combustion air at a temperature between 200 and 300° C., no other air being allowed to enter. This method of operation produces a considerable flow of effluent furnace gas which leaves the furnace containing a high content of zinc which has been evaporated from the slag and oxidised. This effluent leaves the furnace and passes into the effluent gas hood. To increase the concentration of metals in the effluent it is preferably separated or fractionated and filtered.

The crude lead melt flowing out of the furnace is preferably tapped in the presence of air, the molten lead remaining in contact with the air for a time so that a large part of any zinc contained in the lead can evaporate from the surface of the melt and become oxidised. The resulting secondary fly dust is filtered from the effluent gases in the usual way and contains between 4 and 10% of lead. A further part of the zinc dissolved in the lead may be separated out by tapping the molten crude lead at a temperature between 800 and 900° C., into a pot which already contains some solid lead. The solid lead melts and the added molten lead is cooled down to just above its melting temperature. At least 95% pure lead is tapped off from the bottom of the pot, zinc remaining in a lead foam (dross) on the surface of the melt. This foam may be removed and recycled. The yield of lead, in the form of crude lead, by the process according to the invention, is between 70 and 95%, and is usually over 85%.

The secondary fly dust separated out from the furnace flue gases can be fed to the calcining process, and the final fly dust from the sintering process can itself be processed to yield lead and cadminum, among other things. The method according to the invention may be used to process all kinds of fly dusts and mixed oxides containing lead and zinc, irrespective of granularity and of the ratio of lead to zinc. In particular, in contrast to the previously known methods in which soda is added, the method according to the invention can be used for processing mixed oxides in which lead and zinc are present in equal fractions. Furthermore, even fly dusts containing little zinc and a high fraction of sulphur can be successfully processed by this method, there resulting, in contrast to the previously known process involving soda addition, a slag free from alkali. After separating the zinc from this slag the remainder can be used directly, for example, as ballast. A further advantage of the process according to the invention is that, due to the addition of barium sulphate, more than 90% of the sulphur in the slag remains in the form of solid compounds, so that there is little or no destructive and objectionable effluent of sulphur dioxide.

The baryta slag produced by the process according to the invention contains between 20 and 35% of zinc, but only a little lead and tin, whereas the previous processes leave a considerable fraction of tin in the zinc-rich slag, causing special difficulties in the further processing of the slag. The baryta containing slag produced by the process according to the invention can be fed directly to a zinc smelter, because its concentration of tin is not more than 0.1%.

A further advantage of the process according to the invention is that the melting temperature is only between 820 and 1000° C. Very little lead metal therefore evaporates. Furthermore the barium sulphate attacks the furnace lining much less rapidly than does the more costly soda.

Methods of processing in accordance with the present invention are described in detail in the following examples:

EXAMPLE 1

100 parts by weight of a lead fly dust from the calcining process, containing 35% zinc, 41% lead and 3.9% sulphur, were mixed with 49 parts by weight of a size-reduced 80% barium sulphate containing a lead and zinc ore, and 18.5 parts by weight of reducing coke. This raw mixture was melted in a rotary tube flame furnace at between 820 and 990° C. The product consisted of 75 parts by weight baryta slag containing 25.7% zinc, 2% lead, 0.09% tin and 13.3% sulphur, and 27 parts by weight of a secondary fly dust containing 55% zinc, 15% lead and 0.25% tin, and 36 parts by weight of a crude lead containing 97% lead, 0.24% zinc and 0.84% tin. The baryta slag is suitable for being fed to a zinc smelter.

EXAMPLE II 100 parts by weight of a mixture of zinc and lead mixed oxides with a lead concentrate containing sulphides, this mixture containing 35% zinc, 41% lead and 3.9% sulphur, were added to 49 parts by weight of a size-reduced 80% barium sulphate together with 18.5 parts by weight of a reducing coke, and the whole melted in a rotary tube furnace as described for Example I. The resulting baryta slag, the secondary fly dust and the crude lead all had the compositions mentioned for Example I.

EXAMPLE III 100 parts by weight of a lead fly dust containing 33.4% zinc, 41% lead, 4.5% sulphur and 0.8% tin were mixed with 41 parts by weight of a 96% size-reduced baryta together with 18.5 parts by weight of a reducing coke. This mixture was melted in a rotary tube furnace as described for Example I. There were produced 70 parts by weight of a baryta slag containing 26% zinc, 2.04% lead, 0.09% tin and 12.7% sulphur, and 25.3 parts by weight of a secondary fly dust containing 55.4% zinc, 14.4% lead, 0.37% tin, and 3.1% sulphur, and 36 parts by weight of a crude lead containing 97.2% lead, 1.7% tin and 0.09% zinc.

We claim:
1. In a method of processing feed materials containing lead and zinc selected from the group consisting of sulfur containing fly dusts, smelter mixed oxides and other mixed oxides containing lead and zinc, to produce a crude lead, a slag rich in zinc and sulphur and a secondary fly dust which can be sintered, the improvement which comprises mixing said feed materials with barium sulphate and an excess of a reducing agent, the ratio of zinc to barium sulphate in the charge being between 1:0.5 and 1:1.7, and melting this mixture in a furnace at a temperature between 820 and 1000° C.

2. A method as in claim 1, wherein said processing is carried out in a rotary tube furnace and a countercurrent flow of combustion air is supplied to said rotary tube furnace at a temperature between 200 and 300° C.

3. A method as in claim 1, wherein zinc which evaporates during said melting step is oxidised and is then precipitated from the effluent gases of said furnace.

4. A method as in claim 1, wherein zinc and lead mixed oxides containing little lead are processed with ores or ore concentrates containing galena.

5. A method as in claim 1, wherein said reducing agent is coke.

6. A method as in claim 1, wherein the produced molten crude lead is brought into contact with air so that zinc which thereby evaporates is oxidised to give zinc oxide, said zinc oxide being separated from the effluent gases of said furnace together with said secondary fly dust.

7. A method as in claim 6, wherein after the oxidation of said evaporating zinc said molten crude lead is run into a pot containing solid lead so that said solid lead melts and said molten lead cools to a temperature a little above its melting point whereupon a foam containing zinc forms and is drawn off from the surface of said molten lead, and said lead is tapped from the bottom of said pot.

8. A method as in claim 7, wherein said foam is recycled through the process.

9. A method as in claim 1, wherein effluent gases from said furnace are separated.

10. A method as in claim 1, wherein effluent gases from said furnace are fractionated and filtered.

(References on following page)

References Cited

UNITED STATES PATENTS

| | | | |
|---|---|---|---|
| 816,772 | 4/1906 | Betts | 75—77 |
| 816,773 | 4/1906 | Betts | 75—77 |
| 2,139,065 | 12/1938 | Betterton et al. | 75—25 |
| 2,442,674 | 6/1948 | Bardwell | 75—77 X |
| 3,123,465 | 3/1964 | Sunday et al. | 75—25 X |
| 3,149,964 | 9/1964 | Schwartz | 75—25 X |

HENRY W. TARRING II, Primary Examiner

U.S. Cl. X.R.

75—25, 94